United States Patent
Kosinski (12)

(10) Patent No.: US 6,618,556 B1
(45) Date of Patent: Sep. 9, 2003

(54) CHEMICALLY RESISTANT PINHOLE CAMERA

(76) Inventor: James Kosinski, 12 Lancaster St., Cherry Valley, NY (US) 13320-0540

( * ) Notice: Subject to any disclaimer, the term of this patent is extended or adjusted under 35 U.S.C. 154(b) by 0 days.

(21) Appl. No.: 09/878,539

(22) Filed: Jun. 11, 2001

Related U.S. Application Data

(63) Continuation-in-part of application No. 09/407,782, filed on Sep. 28, 1999.

(51) Int. Cl.[7] .......................... G03B 17/02; G03B 17/50
(52) U.S. Cl. .......................... 396/43; 396/429; 396/535
(58) Field of Search .............................. 396/535, 43–47, 396/625, 636, 638, 641, 642, 429, 30; 355/75

(56) References Cited

U.S. PATENT DOCUMENTS

| | | | | |
|---|---|---|---|---|
| 3,828,360 A | * | 8/1974 | Dicus ........................ | 396/43 |
| 4,117,501 A | * | 9/1978 | Peck ........................ | 396/43 |
| 4,329,037 A | | 5/1982 | Caviness ................... | 396/535 |
| 4,440,491 A | * | 4/1984 | Takahama .................. | 355/75 |
| 5,023,641 A | | 6/1991 | Merrick ..................... | 396/88 |
| 5,533,802 A | * | 7/1996 | Garganese .................. | 366/256 |

OTHER PUBLICATIONS

Anonymous, "How to Make and Use a Pinhole Camera", Sep. 28, 1998, Eastman Kodak, p. 1–3.*
Steve Knaus, "Pin–hole cameras", Apr. 13, 1998, p. 1–10.*
Amanda Wolfe, "Silver Photography with Pinhole Camera", 1997, p 1–2.*

* cited by examiner

Primary Examiner—W. B. Perkey
(74) Attorney, Agent, or Firm—Handal & Morofsky

(57) ABSTRACT

A multiple axis pinhole camera has a base, a sidewall, a detachable cover, an inner surface, an outer surface, a support for holding a photographic material and at least one aperture. The pinhole camera is constructed from a paint can. The detachable cover is removed using a pry-type opener provided with the camera. Adhesive tape is used to cover the apertures. The apertures are located on both the sidewall and cover of the pinhole camera. The inner surface of the camera is coated with a chemically resistant light absorbing material such as a black epoxy paint. The inner surface also forms a curved image plane to support the photographic material. The support for holding photographic material can be an adhesive tape or mechanical support. The pinhole camera can be a kit that can hold the necessary components to develop a photograph. These developer components in general include photochemicals, photographic materials, measuring devices, print developing tube, a safelight for processing photographic material and personal protection materials such as plastic gloves.

29 Claims, 11 Drawing Sheets

FIGURE
17

CHEMICALLY RESISTANT PINHOLE CAMERA

CROSS-REFERENCE TO RELATED APPLICATIONS

This application is a continuation-in-part of U.S. patent application Ser. No. 09/407,782, filed Sep. 28, 1999.

BACKGROUND OF THE INVENTION

Cameras generally and pinhole cameras, in particular, have been widely known for centuries. For example, during the Renaissance, an image forming device known as a camera obscura was used to enable an artist to faithfully reproduce scenes. These devices were generally quite large, and, in the case of the camera obscura, the image was recorded by hand. Some of these "cameras" were even the size of a room.

With the advent of modern photochemical processes, the relatively large pinhole camera came to be made in small sizes, more in line with the requirements of silver-based photographic emulsion systems. Unlike a portable camera obscura with a lens, the pinhole camera utilizes a round hole or aperture which allows light to enter the camera without refracting and changing its direction, unlike focusing optics such as a lens. This difference between an aperture and a lens creates a striking difference in the resulting picture taken by a pinhole camera compared to a picture made by a camera with a lens. While a lens will only bring objects within the depth of field into sharp focus, an aperture imparts the same degree of sharpness to the image of all objects, regardless of their distance from the camera, by allowing cones of light of the image to widen in the compartment once past the aperture, but only to the extent permitted by the width of the pinhole and the distance to the image plane.

The pinhole camera has evolved into a useful and important tool in the arts and sciences as well as astronomy and space exploration. The heritage of pinhole cameras continues to be active and is currently undergoing a renaissance in present day America.

The present invention relates to a multiple axis pinhole camera; more particularly, a multiple axis pinhole camera that has multiple apertures, allows the placement of photographic material in a variety of positions within the camera, and contains the necessary developer components to develop a photograph.

The present invention also relates to a kit containing a multiple axis pinhole camera having a hollow structure that can hold the photographic material and necessary developer components to develop a photograph and recover silver from the fixer.

The camera and kit of the present invention presents significant advantages as compared to prior art pinhole cameras. For example, Caviness, U.S. Pat. No. 4,329,037 shows a pinhole camera capable of holding photographic material in place while Merrick, U.S. Pat. No. 5,023,641 teaches a pinhole camera having an adjustable focal length. Both Caviness and Merrick wholly lack any teaching of a pinhole camera having multiple apertures thereby creating multiple axis and different perspectives to take several different types of photographs or more than one photograph at a time. Both of the above patents also lack any teachings related to a pinhole camera capable of containing all the necessary developer components for developing the photograph, once it has been taken.

The principal objective of the present invention is to provide a pinhole camera with multiple axes and apertures for photographic and instructional purposes. It is also an object of the present invention to provide such a device so that more than one type of photographic perspective can be created through the use of multiple axis and apertures. It is also an object of the present invention to provide such a device so that the orientation of photographic material can be altered to create "special effects" in the photographs and expand the types of photographs taken with each perspective. It is also a further objective of the present invention to provide such a device that can hold all of the developer components and chemical solutions necessary to process photographic materials, without having to remove them from the camera.

Another principal objective of the present invention is to provide a kit for taking and developing photographs with a pinhole camera using developer components contained inside the pinhole camera itself.

It is another object of the present invention to provide an easy and user friendly developing process that enables people who are disabled, wheel chair bound, sensory-motor challenged, dyslexic or visually impaired to use the camera and develop a photograph on their own. Another object of the present invention is to provide an environmentally conscious method for developing photographic material without harmfully impacting the environment.

These and other objects of the invention will be apparent to those skilled in this art from the following detailed description of a preferred embodiment of the invention.

SUMMARY OF THE INVENTION

The foregoing objects can be accomplished by providing a multiple axis pinhole camera having a base, a sidewall, a detachable cover, an inner surface, an outer surface, a support for holding a photographic material and at least one aperture. The pinhole camera is constructed from a paint can. The detachable cover is removed using a pry-type opener provided with the camera. Adhesive tape is used to cover the apertures. The apertures are located on both the sidewall and cover of the pinhole camera. The inner surface of the camera is coated with a chemically resistant and light absorbing material such as black epoxy paint. The inner surface also forms a curved image plane to support the photographic material. The support for holding photographic material can be an adhesive tape or a mechanical support.

The pinhole camera is a kit that can hold the necessary components to develop a photograph. These developer components in general consist of photochemicals, photographic materials, measuring devices, print developing tube, a safelight for processing photographic material and personal protection material such as plastic gloves.

BRIEF DESCRIPTION OF THE DRAWINGS

The above and the other objects and advantages of the invention will become apparent from the detailed description of the invention which appears below and from the following drawings, in which.

DESCRIPTION BEST MODE OF THE INVENTION

Figure 1:
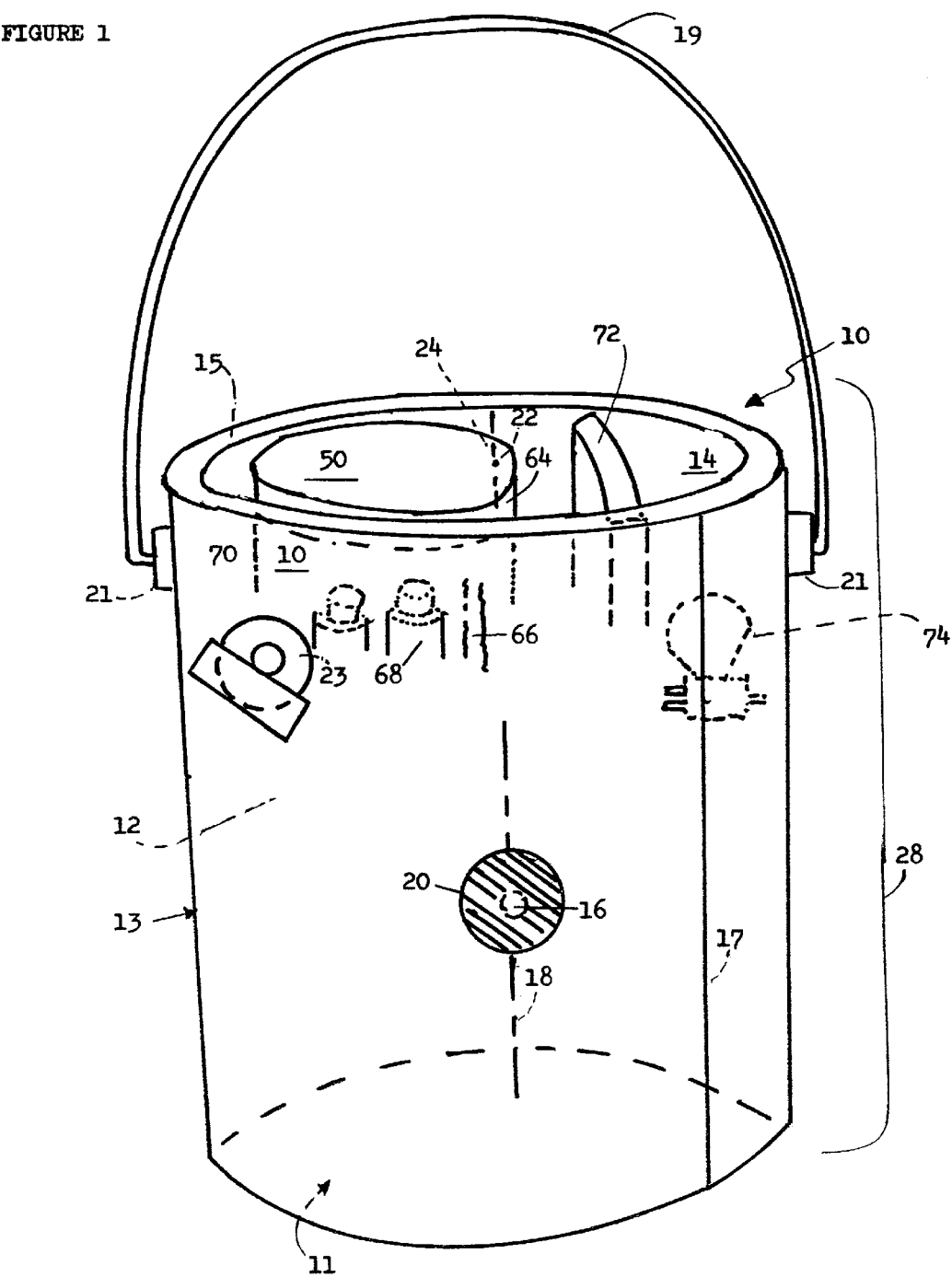
FIG. 1; is a front view of a multiple axis pinhole camera in accordance with the present invention.

Referring to FIG. 1, a multiple axis pinhole camera 10 constructed in accordance with the present invention is illustrated. Multiple axis pinhole camera 10 is constructed from a sheet metal can 12 with a detachable cover 14. Can 12 and its cover 14, in accordance with the preferred embodiment of the invention, are of the type used to contain paint. In accordance with the embodiment of the invention constructed by the applicant, a conventional lined paint can and its cover are used to make the inventive pinhole camera 10.

Camera 10 comprises a bottom 11, a side wall 13 and rim 15. Side wall 13 is formed from an ordinary piece of sheet metal with a seam 17 extending vertically along its side.

In accordance with the preferred embodiment of the invention, camera 10 is provided with a carrying handle 19 secured into supports 21 substantially identical to those used in gallon paint cans.

Figure 2:
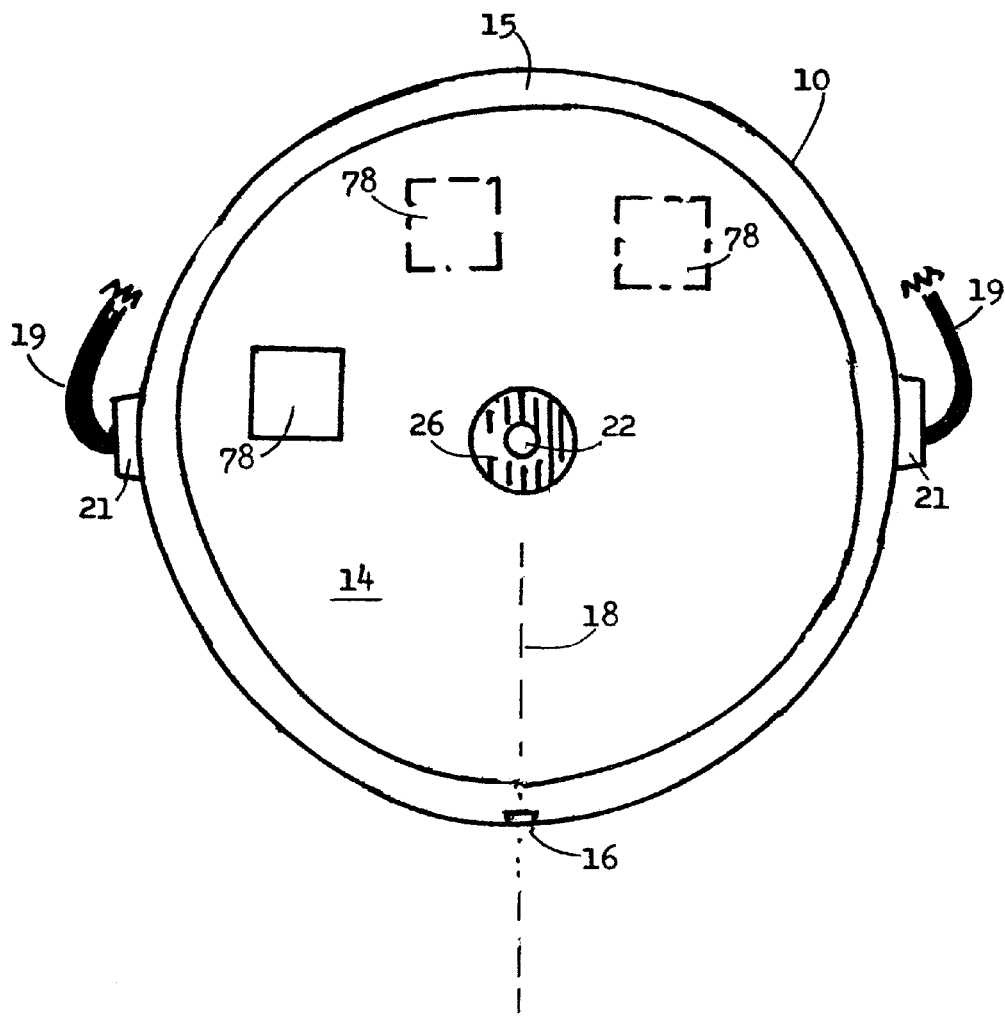
FIG. 2 is a top view of the pinhole camera illustrated in FIG. 1.

A first aperture 16 corresponding to a first picture-forming axis 18 is preferably centered on the surface of pinhole camera 10. The area defining the aperture is painted black to reduce distortions and aberrations. For purposes of illustration, the pinhole or aperture 16 is shown greatly exaggerated in size. A shutter 20 constructed from an opaque material covers aperture 16. A second aperture 22 corresponding to a second picture-forming axis 24 is preferably centered on cover 14 as shown in FIG. 2. A shutter 26 also constructed from an opaque material covers aperture 22. In accordance with the preferred embodiment of the invention, the shutters 20 and 26 are made of black tape such as so-called "duct" tape or black vinyl electrical tape. Also in accordance with the preferred embodiment of the present invention, lid 14 can be removed using an opener 23, (which may be a washer taped to the camera 10) as shown in dashed lines in FIG. 1 adhered to another part of camera 10 by an adhesive tape, or even a screwdriver.

In accordance with the preferred embodiment of the invention, the dimensions of camera 10 are approximately 7.5 inches or 19 centimeters in height and 6.5 inches or 16.5 centimeters in diameter. Camera 10 is made of sheet metal approximately 0.01 inch or 0.254 millimeters thick and plated with a metal or other material which prevents corrosion. In accordance with the present invention, the greater the diameter of can 12, the larger the image will be. In principal, this is because light emanating from a point on an object being photographed and entering the camera, is in the configuration of a cone with its apex at the point being photographed and its base, or widest point, being on the surface bearing the film. Thus, the greater the ratio of the distance between the pinhole and the image surface, the larger the image will be.

The diameter of first aperture 16 is dependent upon the diameter of pinhole camera 10. The diameter of second aperture 22 is dependent upon length 28 of pinhole camera 10. For practical purposes, however, both apertures 16 and 22 may have diameters of approximately 0.0197 inch or 0.5 millimeters, each corresponding to a preferred distance of approximately 8 inches or 20.3 centimeters for pinhole camera 10.

The present invention contemplates using a drill bit, a punch or a laser to fashion each apertures 16 and 22 in order to create a hole with true roundness. Also contemplated is using a fine grit material to grind away and minimize burrs and other defects around each aperture 16 and 22 within the interior surface of the camera 10.

The present invention also contemplates that, in order to reduce potential interference and diffraction effects at apertures 16 and 22, the area surrounding each aperture within can 12 must be blackened or coated with an opaque material in order to absorb stray light and prevent light scattering. In addition, it is preferred that the entire inside of the camera be coated with a flat, nonreflective material such as a chemically resistant flat black paint or a plastic.

The image surface is determined by the user. The user may place the photographic film 30 against the curvature of can 12 when using first aperture 16 or the base of can 12 when using aperture 22. As the focal length is shortened the exposure time is reduced.

In connection with this, it is noted that a pinhole camera produces a focused image for objects at all distances, while at the same time providing that focused image at all points in the volume behind the pinhole. Thus, the image surface need not be a plane, but any surface, with the result that uniform focusing is achieved. In principle, it may be said that a pinhole camera has an infinite depth of field and, as opposed to a focal plane, it has a focal volume comprising all space on the side of the pinhole opposite the object. This allows the achievement of unique special effects with irregular focal surfaces and great depth of field. In accordance with the present invention, it has been found that light sensitive film or paper up to seven inches or 17.8 centimeters by 14 inches or 35.5 centimeters in size or smaller, sold by many photographic manufacturers is a suitable size for use in camera 10.

Figure 3:
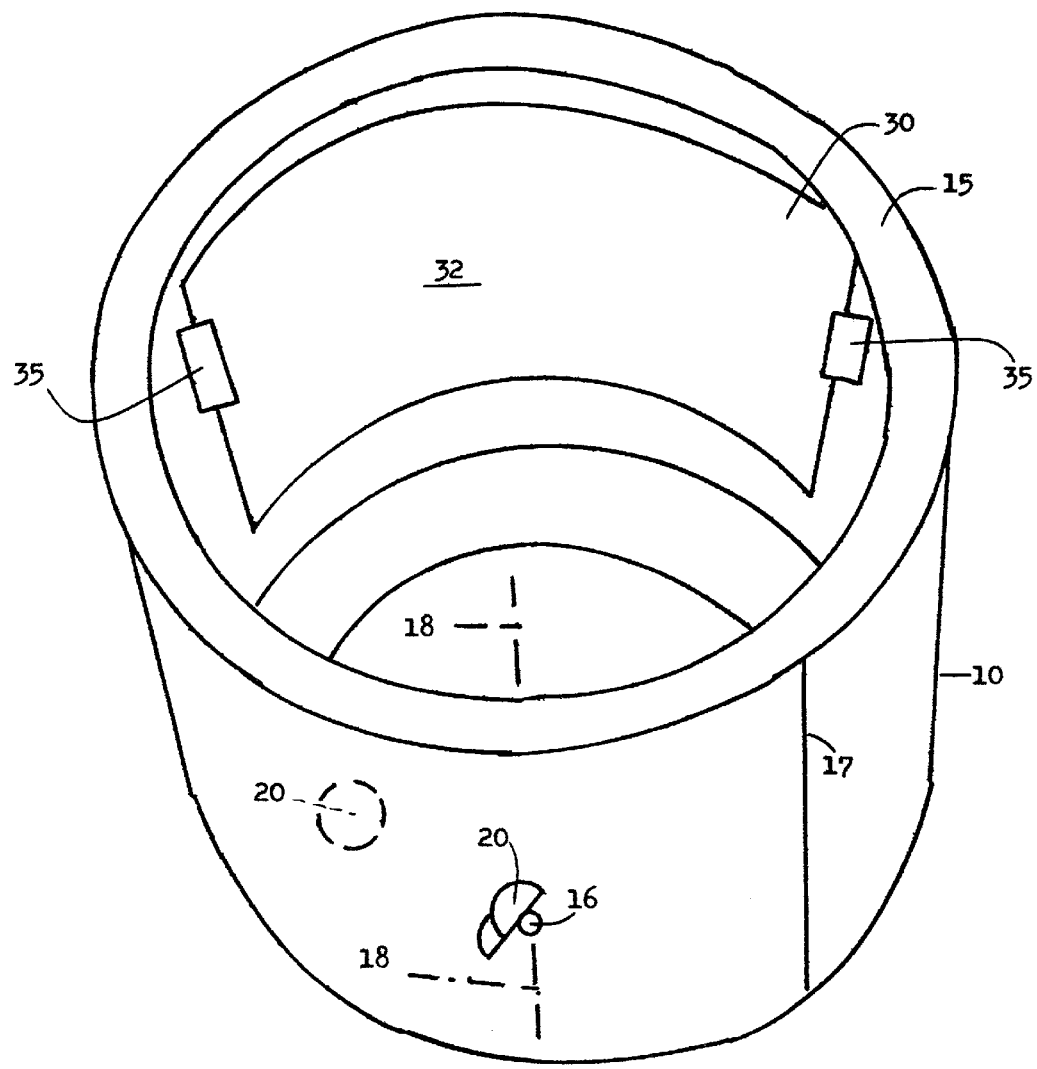
FIG. 3 is a top elevational view of the inventive pinhole camera depicting the placement of photographic material within the single compartment parallel to the first axis.

In use, camera 10 is loaded with photographic film or paper 30, as is the case with a conventional camera. Photographic film or paper 30 must be positioned within the can 12 of pinhole camera 10 while in a dark room. The emulsion side 32 of photographic film or paper 30 is placed facing toward the aperture 22 and transverse to second picture-forming axis 24 within pinhole camera 10, as shown in FIG. 5. The emulsion side 32 of photographic film 30 can also be placed facing toward aperture 16 and perpendicular to first picture-forming axis 18 as shown in FIGS. 3 and 4.

In accordance with the present invention, it is found that an adhesive tape may be used to mount the photographic film. As an alternative to tape, it is also possible that the photographic material to be exposed be mounted between fingers 60 or other mechanical supports positioned within the body of the camera formed by can 12, as illustrated in dashed lines in FIGS. 4 and 5.

Figure 4:
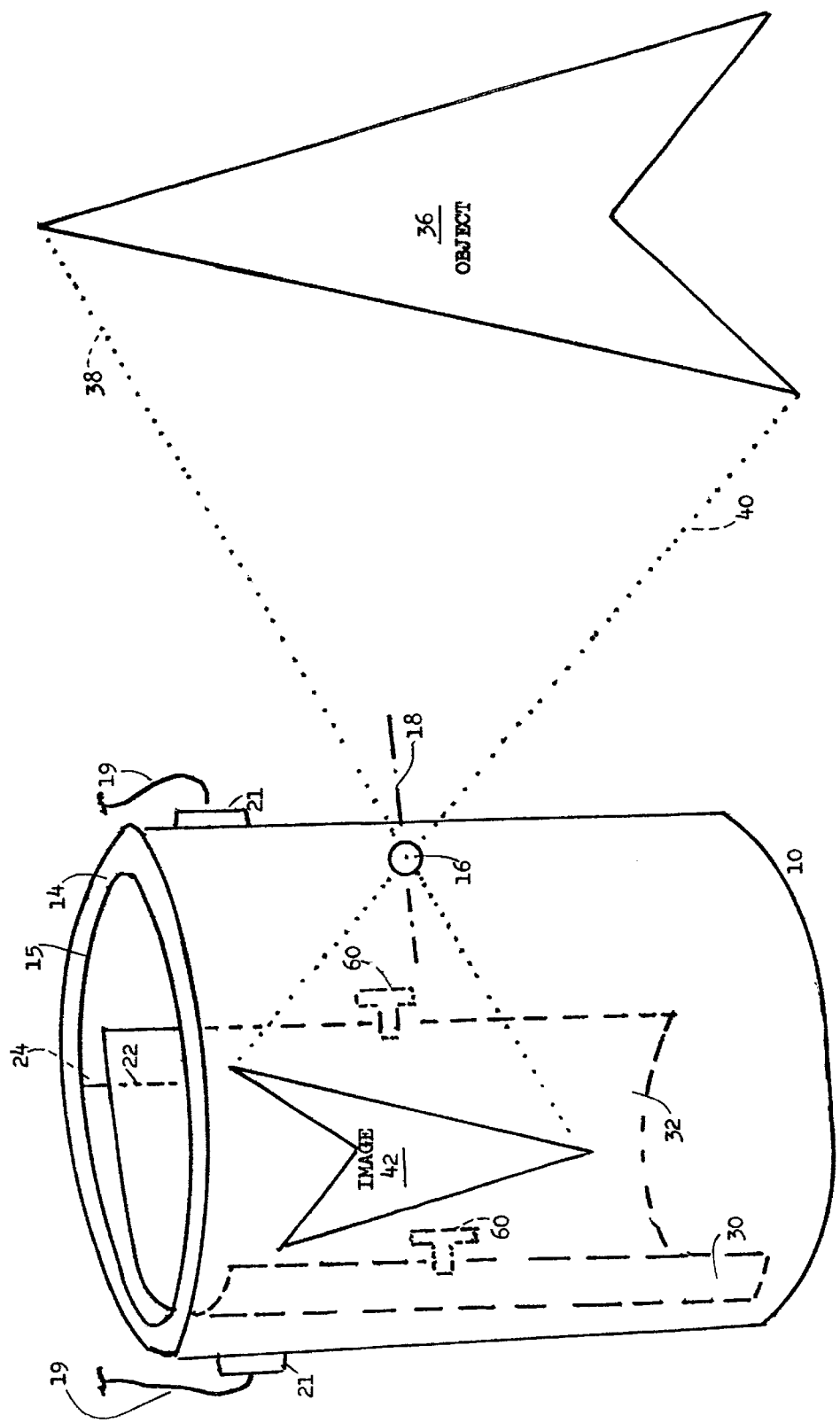
FIG. 4 is a side view of the camera of the present invention depicting an object being photographed using the aperture centered on the surface of the camera.
Figure 5:
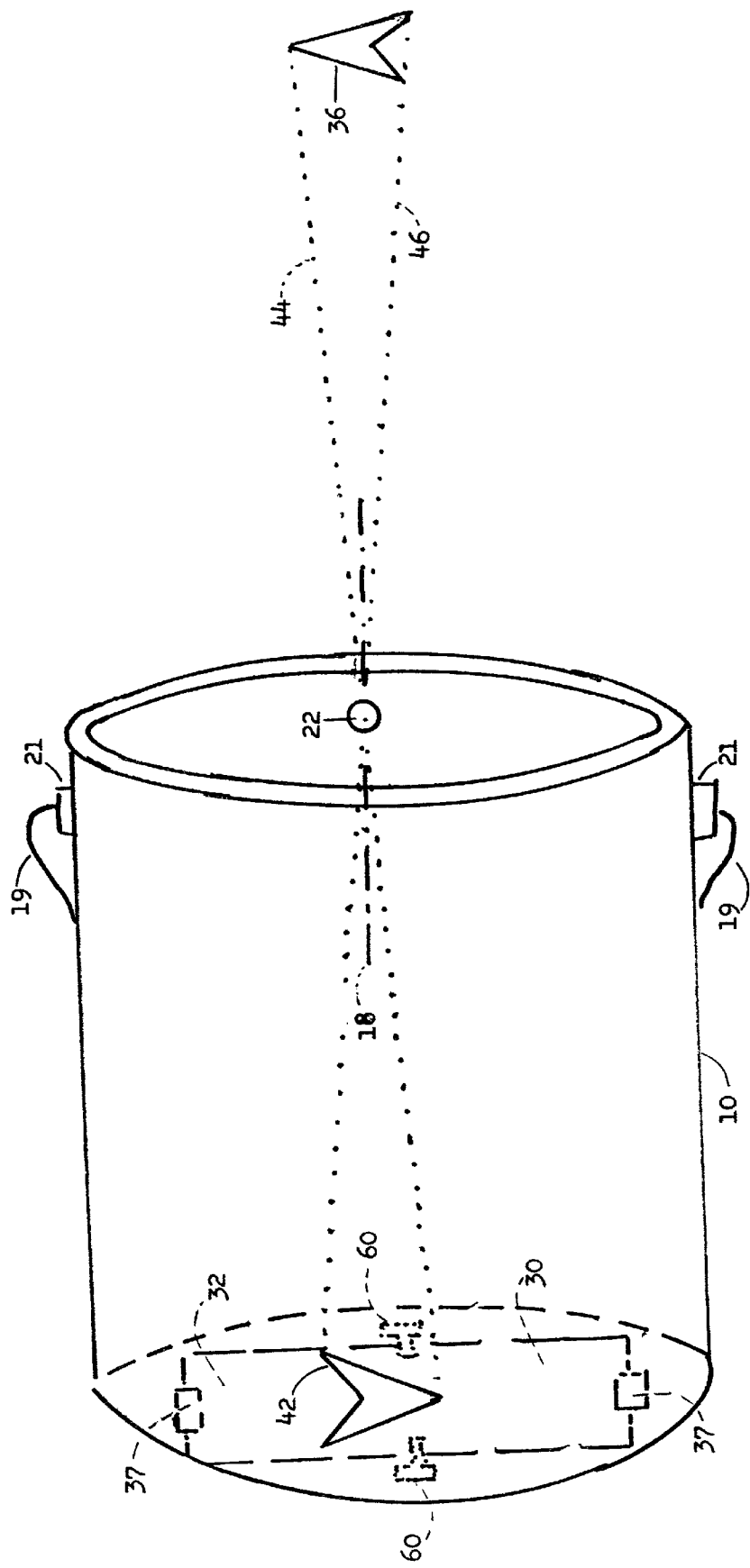
FIG. 5 is a side view of the camera of the present invention depicting an object being photographed using the aperture centered on the cover of the camera.

Exposing the emulsion side 32 of photographic film or paper 30 when perpendicular to first picture-forming axis 18 and along the curvature of the inner surface of can 12, as shown in FIG. 4, generates an image having a concave or inward semi-spherical perspective referred to as a "special effect" due to the unique effect the shape of the image plane creates upon the emulsion side 32 of photographic film or paper 30.

In accordance with the preferred embodiment of the invention, a complete special effects camera and darkroom are included in the paint can which forms the inventive camera. The same may be better understood with reference to FIGS. 1 and 2. In particular, developing tube 50 may be contained within can 12. Upon removal of cover 64 from tube 50, one will see a pair of rubber gloves 66, a plastic container of developer 68 and a plastic container of fixer 70. One may also put the silver recovery bundle, consisting of metallic wool, wrapped with a string which allows it to be dipped into the solution and removed without contaminating the hands.

Fifty sheets of 5 in by 7 in black and white photographic paper 72 may also be contained within can 12, thus providing paper on which images may be exposed and developed. Finally, the kit is completed by a photographic safelight 74 which may be approximated with an ordinary night light of the type which plugs into a socket, and has on-off switch, although the such a switch is not necessary. In place of the normal white light which would normally be packaged with such a night light, a red Christmas tree light with an appropriate screw base is substituted. Finally, additional pieces of tape 78 are adhered to the inside of the cover or lid 14 of the paint can which forms the camera body to serve as replacement shutters should the originals become fouled or lost.

Figure 6:
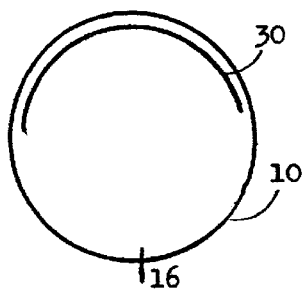
FIG. 6 is a top elevational view of the camera of the present invention depicting the photographic material in an alternative position within the compartment of the camera.
Figure 7:
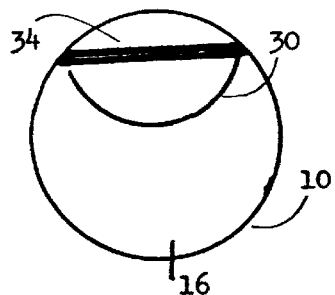
FIG. 7 is a top elevational view of the camera of the present invention depicting the photographic material in an another alternative position within the compartment of the camera.
Figure 8:
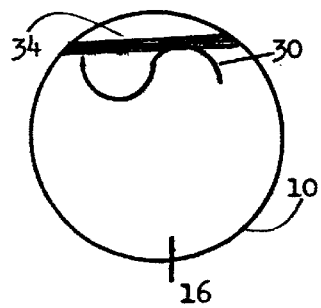
FIG. 8 is a top elevational view of the camera of the present invention depicting the photographic material in yet another alternative position within the compartment of the camera.
Figure 12:
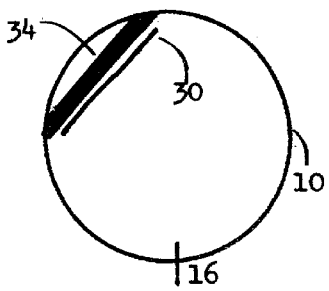
FIG. 12 is a top elevational view of the camera of the present invention depicting the photographic material in one more alternative position within the compartment of the camera.
Figure 13:
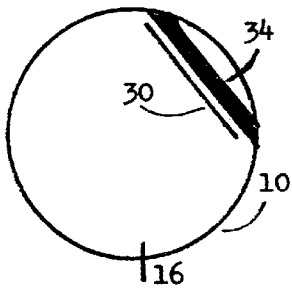
FIG. 13 is a top elevational view of the camera of the present invention depicting the photographic material in an additional different position within the compartment of the camera.
Figure 14:
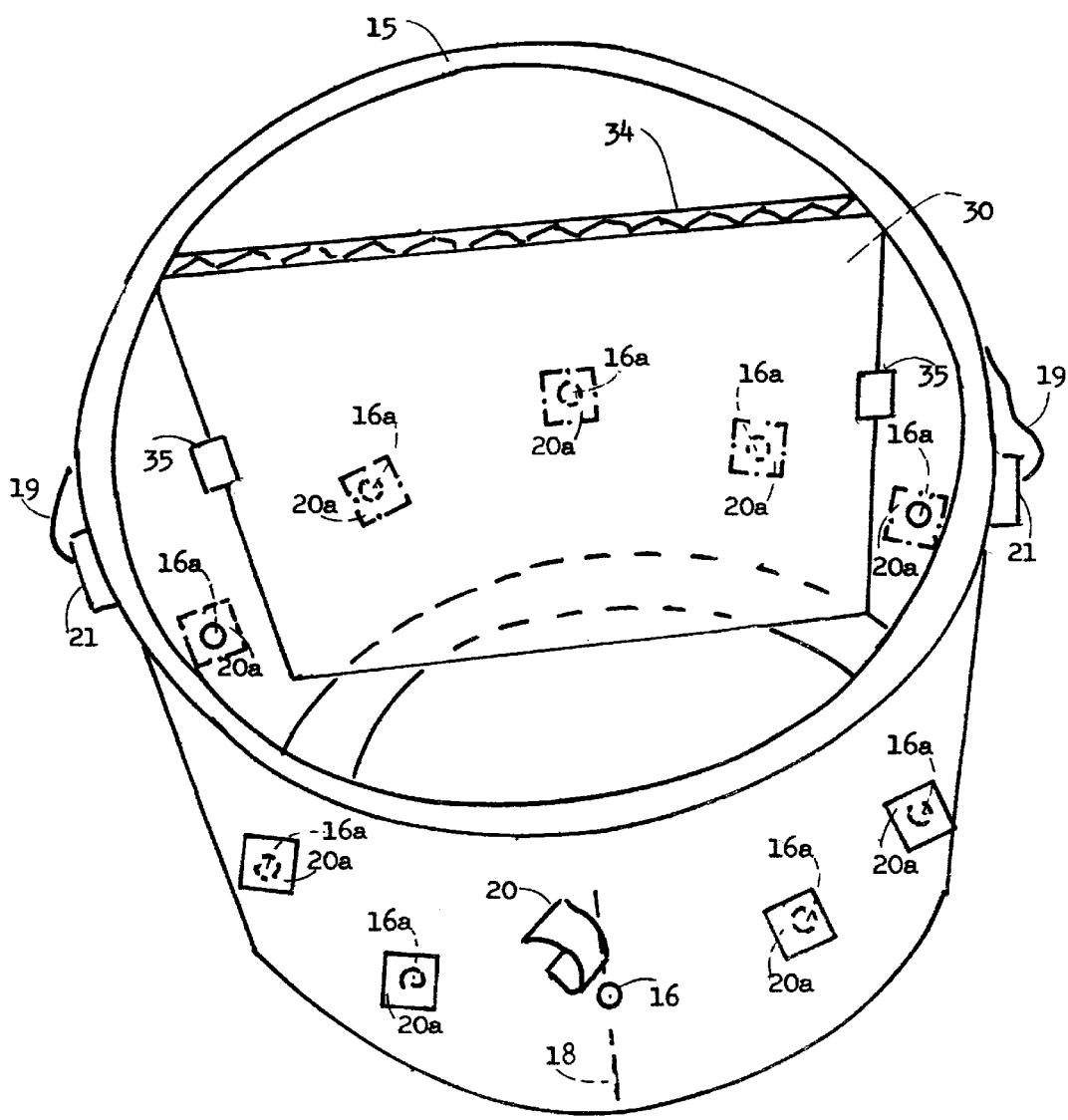
FIG. 14 is a top elevational view of the camera of the present invention depicting an insert placed inside the compartment of the camera.

Several different types of perspectives may be created by altering the orientation of photographic film or paper 30 with respect to first picture-forming axis 18 within can 12 of pinhole camera 10 as depicted in FIGS. 6–13 by fashioning an insert 34 as shown in FIG. 14. Insert 34 is made of corrugated cardboard or any other suitable stiff material and is positioned as shown in FIG. 14. It may be secured in this position using glue or adhesive tape such as a tape strip 35. A piece of photographic film or paper 30 may be held in place by any suitable means, such as tape strips 35 or double-stick tape disposed between the negative and insert 34, or even magnets. FIG. 6 depicts an orientation of photographic film 30 in can 12 in which the resulting image will have a concave or semi-spherical perspective. FIG. 7 depicts another orientation of photographic film or paper 30 on insert 34 in can 12 in which the resulting image will have a convex or outward semi-spherical perspective. FIG. 8 depicts photographic film or paper 30 on insert 34 placed in can 12 in still another orientation in which the resulting image will have a convex perspective on the area of photographic paper 30 facing outward and a concave perspective on the area of photographic paper 30 facing inward.

Figure 9:
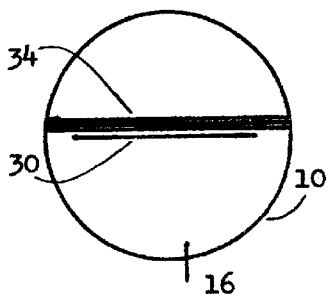
FIG. 9 is a top elevational view of the camera of the present invention depicting the photographic material in still yet another alternative position within the compartment of the camera.
Figure 10:
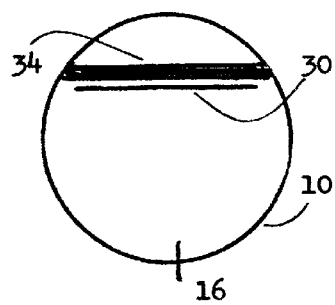
FIG. 10 is a top elevational view of the camera of the present invention depicting the photographic material in still another alternative position within the compartment of the camera.
Figure 11:
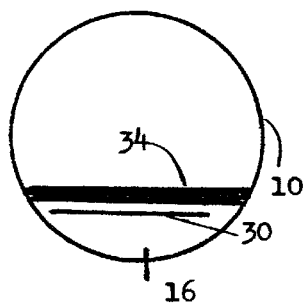
FIG. 11 is a top elevational view of the camera of the present invention depicting the photographic material in yet even another alternative position within the compartment of the camera.

FIGS. 9–11 depict photographic film or paper 30 on insert 34 placed at various distances within can 12 from aperture 16. These orientations create different angles of perspective of the object being photographed. FIGS. 12–13 depict yet two additional orientations of photographic film material 30 on insert 34 which change perspective predominantly in the vertical plane.

In accordance with the preferred embodiment, it has been found that when paper of the type sold by Ilford under the name Multigrade IV is used within the camera in sunlight an approximate exposure time of five seconds is required when the photographic paper is placed two inches away from either aperture 16 or aperture 22.

In use, photographic film or paper 30 is also positioned within camera 10 for use with aperture 16, and lid 14 is put in position closing the otherwise opened top of can 12. In addition, it is also important to be certain that shutter 26 is taped over hole 22. Shutter 20 is then opened, by being peeled off and removed, perhaps by being adhered to another portion of the camera as illustrated in dashed lines in FIG. 3. This is done to allow light to pass through aperture 16 and expose the photographic material when the user takes a picture of an object 36. As illustrated in FIG. 4, once shutter 20 is removed, light rays such as light rays 38 and 40, from an object 36 to be photographed, enter pinhole camera 10 through aperture 16 and strike the emulsion side 32 of photographic material 30. The tape is replaced over the pinhole at the end of the exposure.

As noted above, the diameter of the aperture 16 is exceedingly small compared to a typical camera lens, even when the iris is at minimum diameter. Thus, relatively small amounts of light from the object being photographed are input into the camera during the exposure of the picture. Accordingly, it is necessary that relatively long exposure times be employed in order to have enough light fall on the film to expose it. It will also be apparent that reductions in exposure time may be achieved by increasing the intensity of light falling on the object being photographed. This may be achieved by using the sun or an artificial light source, such as a strobe, flash bulb, high intensity "white light" source, or the like.

Alternatively, or in addition to using illumination and long exposure times, the photographer also has the option of using a highly sensitive photographic film, capable of being sufficiently exposed with relatively small amounts of light. It is also possible to "push" the film by over developing, that is by leaving the exposed film in the developer for an extended period of time.

After photographic film or paper 30 is exposed to light for a pre-determined amount of time, shutter 20 is closed.

During this time a latent image 42 of object 36 is recorded on the emulsion side 32 of photographic film or paper 30. As in the case of all pinhole cameras, the image is in an inverted position.

Likewise as shown in FIG. 5, image 42 of object 36 can also be formed by exposing the film through the pinhole 22 in the lid of the camera. In this case, the film or paper 30 is placed at the bottom of can 12 in the darkroom and secured in position as illustrated in FIG. 5 by segments of tape 37. Shutter 26 of pinhole camera 10 is then removed for a period of time sufficient to expose photographic film or paper 30 inside can 12 of pinhole camera 10. Light rays, such as light rays 44 and 46 from object 36, enter pinhole camera 10 through aperture 22. Light rays 44 and 46 strike the emulsion side 32 of the photographic material 30. Shutter 26 is then closed. During this time an image 42 of object 36 is recorded on the emulsion side 32 of photographic material 30 with a latent inverted image as illustrated in FIG. 5.

In accordance with the present invention, it is found that an exposure time of 30 seconds in bright sunlight in the configuration illustrated in FIG. 5 is sufficient to obtain a well-exposed negative on black and white, variable contrast, RC paper with a matte finish sold by Ilford under the designation of Multigrade IV.

Also, in accordance with the present invention, standard variable contrast filters sold by Ilford under the designation of Multigrade filters can be placed inside the camera behind either aperture 16 or 22 to adjust the contrast during exposure of the negative. Also, colored gels, filters and other materials may be placed inside the camera to change the color or artistic rendering of the photograph.

After the paper has been exposed using any of the above configurations described above, it then becomes necessary to remove the paper from the inventive pinhole camera if the developing tube is used for processing. Because the paper continues be photographically sensitive, this is done in a darkroom illuminated by a safelight. In particular, reference is made to FIG. 15. The lid 14 is pulled off the can 12, using an opener 23 or perhaps even a screwdriver, and the exposed paper is put in a developing tube 50. Developing tube 50 is then filled with standard photographic print developer solution and a lid 51 is put over the tube to close it during the development process. The user can elect to process the image directly in the camera due to the high chemical resistance of the lining.

In accordance with the present invention, the best temperature range for processing a negative is 65 to 75 degrees Fahrenheit. Also in accordance with the present invention, hypoallergenic liquid concentrates such as developer are provided to eliminate health risks associated with powdered chemicals. The standard photographic developer solution such as Sprint Quicksilver does not contain Metol, which is noted for producing allergic reactions. In accordance with the present invention, developer working solution is prepared by mixing the developer concentrate with water at a 9:1 ratio. A practical minimum of 100 milliliters of developer working solution is required. The developer concentrate is sold by Sprint under the designation Quicksilver.

Figure 15:
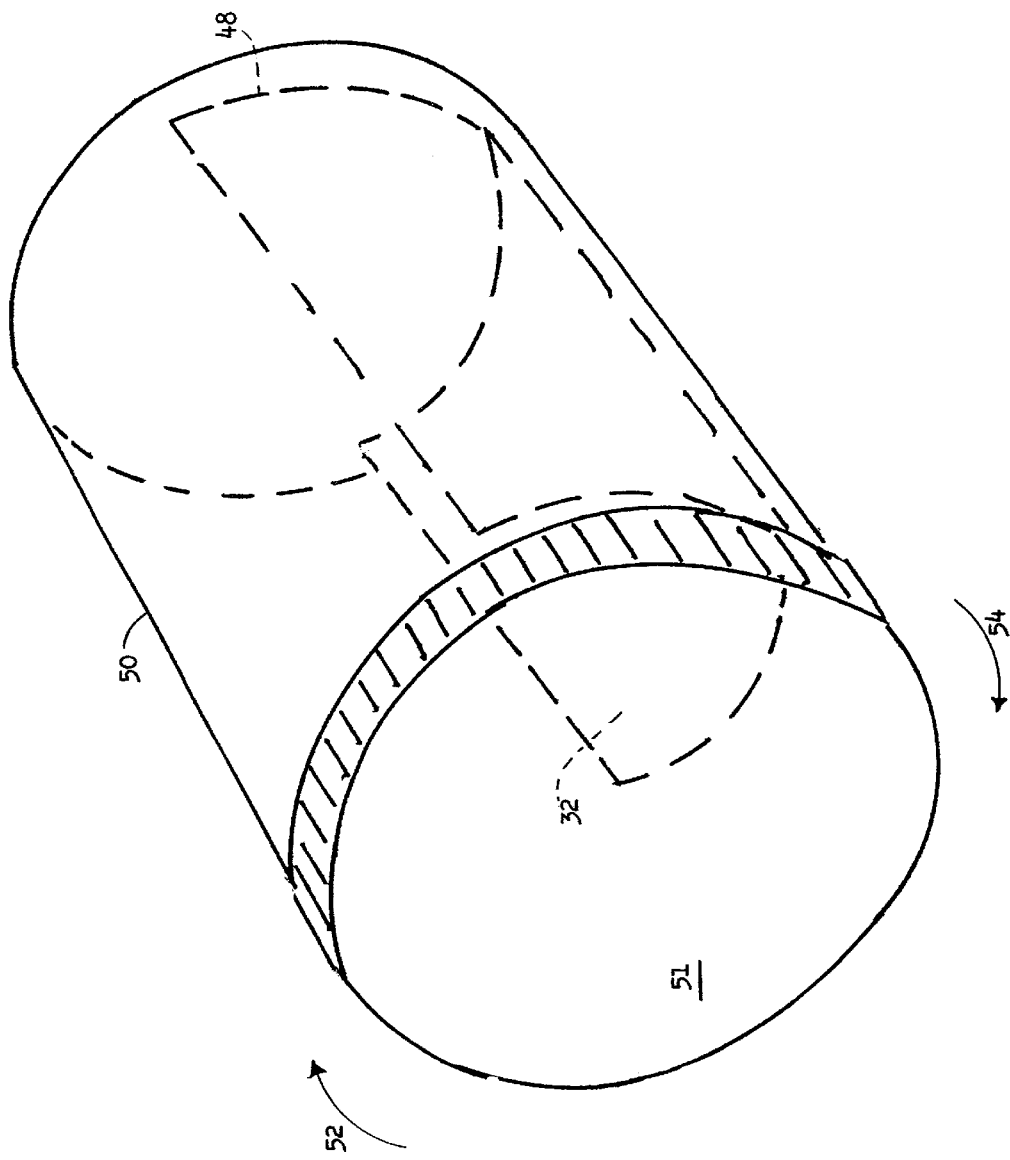
FIG. 15 is a side view of the tube containing a negative in preparation for the development stage.

Referring to FIG. 15, exposed paper 48 is developed by placing it in a developing tube 50 with the emulsion side 32 facing inward as shown in FIG. 15. The developer working solution is added. Tube 50, which has been closed and sealed, is then rolled on a flat surface or in the hands as indicated by the direction of arrows 52 and 54 for approximately one minute.

In accordance with the present invention, the developing tube is a thirty-two ounce HDPE bottle with a screw on lid. However, once the rolling is completed, tube 50 is opened and the developer working solution is poured out. Water is then added to tube 50.

Again, tube 50 is sealed and then rolled for at least twenty (20) seconds until the remaining developer working solution is sufficiently diluted. Once the remaining developer working solution is sufficiently diluted, the water is poured out of the tube 50.

In accordance with the present invention, the duration for rolling tube 50 is not critical as long as the developer is sufficiently diluted.

At this time the fixer is added to the tube 50. The tube is then sealed. Tube 50 is again rolled for approximately one minute. The fixer is then poured out of the tube 50 and conserved for the recovery of the silver in the fixer solution. Light may be turned on when fixing is complete.

In accordance with the present invention, the fixer is prepared by mixing the fixer concentrate with water at a 9:1 ratio. A practical minimum of 100 milliliters of fixer solution is required. The fixer concentrate is sold by Sprint under the designation Record.

At this point the image has been transformed into a permanent negative. Negative 48, while still contained in tube 50, must now be rinsed approximately three times with water. After that, negative 48 is removed from tube 50 and washed with water for a duration of approximately one minute and allowed to dry. A positive can now be made from negative 48 by contact printing or by projection if the positive must be enlarged or reduced.

In accordance with the present invention, standard variable contrast filters sold by Ilford under the designation of Multigrade can be used in the darkroom to adjust the contrast of the final positive print.

Figure 16:
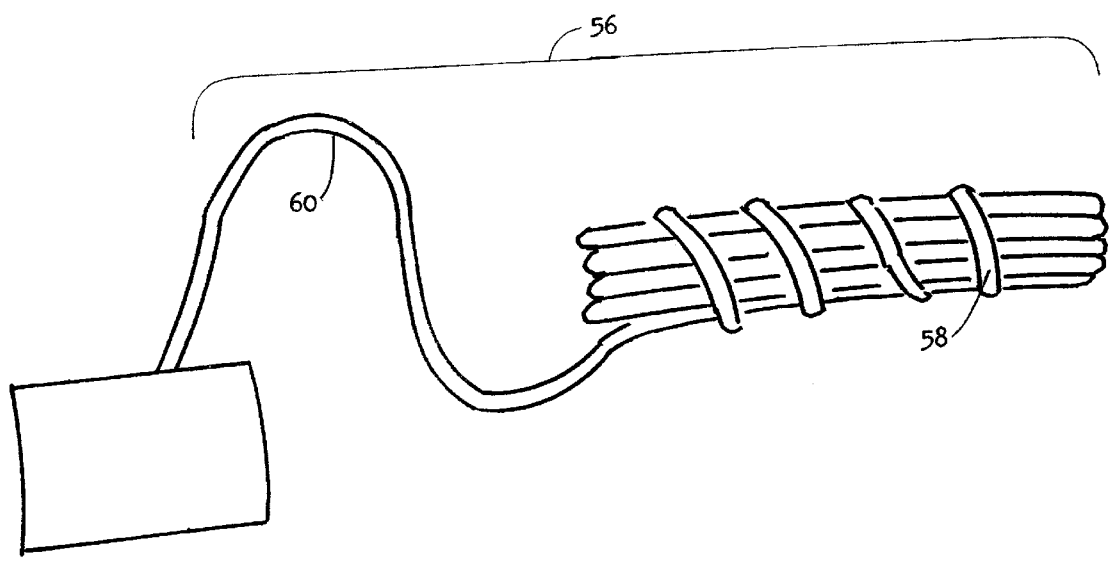
FIG. 16 is a diagram of the silver recovery bundle.

As noted above, the fixer removed from tube 50 is then collected in a container so that the silver may be recovered. A silver recovery bundle 56 as shown in FIG. 16 is used to remove the silver from approximately one liter of used black and white fixer. The silver recovery bundle 56 preferably consists of a metal bundle 58, which is made of a metal wool or wire that will replace silver in the used fixer solution. Metal bundle 58 is bound several times around with a monofilament 60. In accordance with the present invention, monofilament 60 can be made from ordinary fishing line.

In accordance with the present invention, it is found that metal bundle 58 can be constructed from approximately four grams of steel wool. In the alternative brass or other metals may also be used to construct bundle 58. Additionally, it is found that a porous covering, such as a tea bag can encase the bundle 56 enabling it to be reused more easily.

The bundle 56 is lowered into the fixer by monofilament 60. In accordance with the present invention, it is found that silver begins forming on the outer surface of metal bundle 58 in twenty to sixty seconds as evidenced by its darkening in color. In accordance with the present invention, it is found that if bundle 56 is left in the fixer for twenty-four hours it will remove over ninety-nine percent of the silver and leave approximately 5 ppm of silver. Accordingly, it is found that increasing the amount of metal contained in bundle 56 increases the recovery of silver and leaves approximately 2 ppm of silver or less.

When recovery of the silver is completed, the bundle 56 is removed and rinsed with water. Bundle 56 is then dried and then stored or refined depending upon the user's desire.

As depicted in FIG. 14, another alternative embodiment of the present invention contemplates a pinhole camera having a multiple-axis design using multiple apertures aligned in a circle to create a spherical field of view or a 360 degree perspective. One or more photographic films placed inside the single can or multiple cans would absorb light through one or more of the apertures 16a and create an image having various perspectives of and/or superimposed images of things surrounding the pinhole camera, depending upon which of the black tape shutters 20aare peeled back and opened to admit an image forming cone of light.

Figure 17:
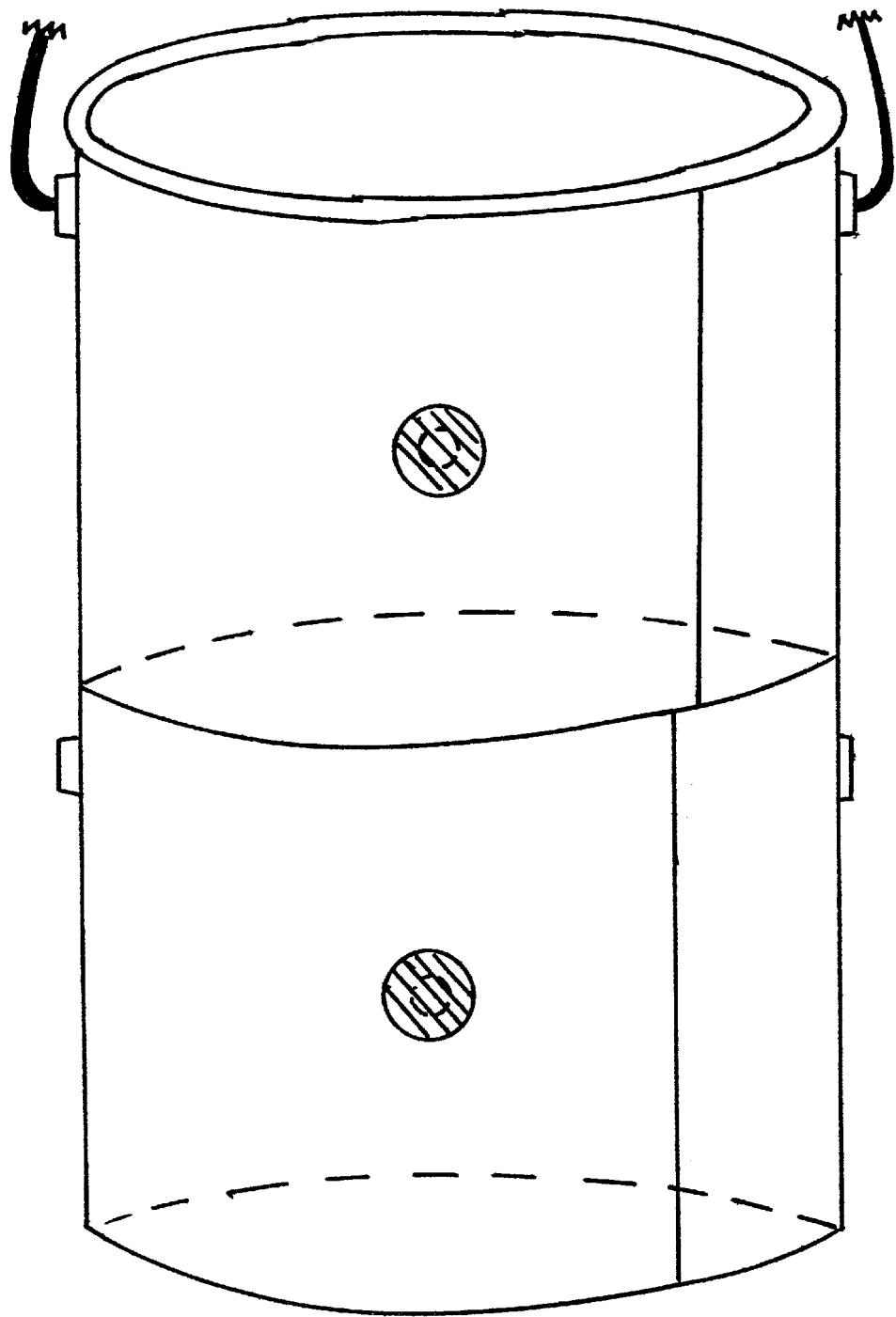
FIG. 17 is a diagram of a compartmentalized camera capable of taking more than one photograph per outing.

As depicted in FIG. 17 an alternative embodiment of the present invention also contemplates a pinhole camera having multiple cans and multiple-axises corresponding to these cans whereby multiple apertures are arranged in separate compartments that allow taking more than one photograph per outing.

Figure 18:
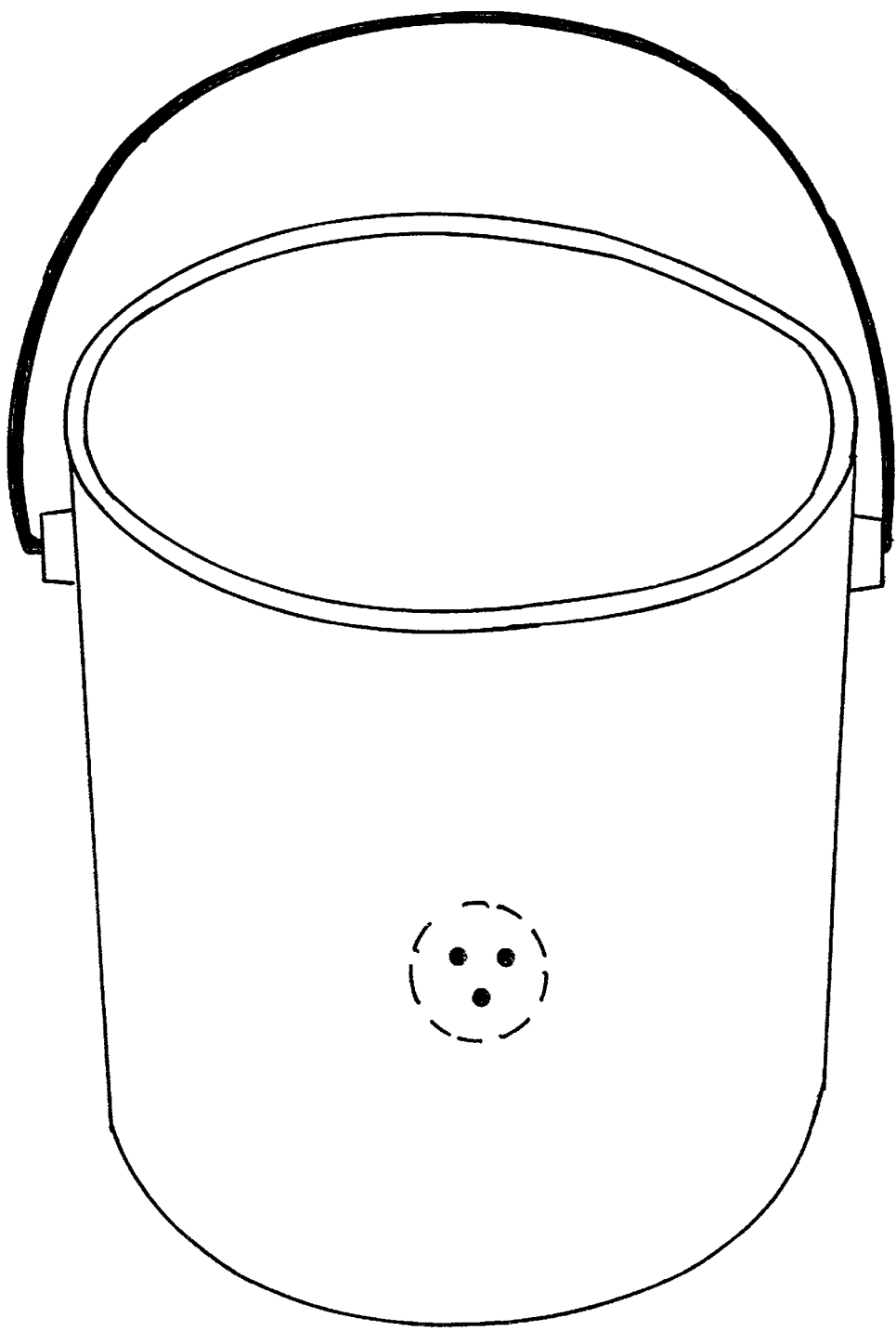
FIG. 18 is a diagram showing two or more apertures placed sufficiently close togther to take photographs containing overlapping images.

As depicted in FIG. 18, another alternative embodiment of the present invention also contemplates a pinhole camera having two or more pinholes placed sufficiently close to form overlapping images.

In addition, in accordance with the present invention, it is contemplated that the safelight, developer, fixer, developing tube 54, as well as a supply of film or paper may be contained within the can 12 during transport or storage. Thus, the present invention forms a kit which is self-contained and may be carried from placed a place and used to make negatives. All that is needed is a dark place within which to work with the film or paper, a source of water and a power supply for the safelight bulb. A chemically activated "glow stick" that is orange or red in color can replace the safelight if there is no power available. This darkroom process fits in the space of one tray 8 inches or 20.3 centimeters by 10 inches or 25.4 centimeters, reducing the conventional processing space requirements by seventy-five percent or more.

Also in accordance with the present invention, it is contemplated that a paper with an applied emulsion coating may be used to directly make prints using the inventive camera.

In accordance with an alternative embodiment of the invention, the use of electrical tape as a shutter is replaced by a magnetic flexible member, of the type typically made of polymeric plastic. Such magnets are extensively used as calling cards and are usually intended to act as refrigerator magnets. In accordance with the invention exactly this sort of device, may be used as a shutter. In accordance with the preferred embodiment of the invention, the magnetic plastic material which forms the shutter is black or dark and has a matte finish. It is also preferred that the portion of the camera over which the magnet is placed when it is closing the pinhole is also painted black.

Also, in accordance with another alternative embodiment of the invention, it is contemplated that the inside and/or the outside of the can which forms the camera is painted with a material which can withstand photographic and other chemicals. Generally, such inside coatings of cans are available on the open market as paint cans. However, care must be taken because not all paint cans have this coating on their inside.

During in-camera development of photographic material such as film or paper after exposure, the pinhole should be sealed to allow for extended exposure times without loss of chemicals or the need to maintain orientation of the can. Such sealing of the pinhole also prevents ambient and stray light from interfering with the image during the development process. The pinhole may be sealed using black electrical tape such as that used with a shutter or, while less effective, the magnetic shutter may be used.

In another embodiment of the invention, the camera parts may be constructed from stainless steel, plastic, and other materials with suitable chemical resistance and light managing properties, for example, a conventional tank used to process photographic roll films.

In accordance with still another alternative embodiment of the invention, the tube for developing a negative or photographic paper, after it has been exposed, may be made of clear plastic, such as PET, although other clear plastic materials may be suitable. This allows development to be seen and monitored. Of course, such development may only be seen under a safelight. A safelight may be replaced by an ordinary lightbulb covered with several layers of clear red cellophane.

Finally, in accordance with the invention, yet another alternative version of the inventive camera may be employed. In accordance with this embodiment, the camera is filled with water weights or other substances and then used to take pictures underwater and in other harsh environments.

While an illustrative embodiment of the invention has been described above, it is of course understood that various modifications will be apparent to those of ordinary skill in the art. Such modifications are within the spirit and scope of the invention, which is limited and defined only by the appended claims.

What is claimed is:

1. A pinhole camera photography and picture making kit, comprising
   (a) a base,
   (b) a sidewall secured to and extending from said base, said sidewall having a top and a bottom portion, said base being secured to said bottom portion, and said top portion defining an opening,
   (c) a detachable cover adapted to be secured to said top portion of said sidewall to close said opening, said base, side wall and detachable cover defining a camera body, said camera body having an inner surface, and an outer surface,
   (d) a support member for holding a photographic material within said camera body,
   (e) at least one pinhole aperture defined in said-camera body,
   (f) a shutter for opening and closing said pinhole aperture,
   (g) first light sensitive non-self developing-materials for receiving and recording a photographic image contained within said camera body, said first materials comprising a substrate and a light-sensitive coating disposed on said substrate, said first materials requiring additional materials not associated with said first materials in order to be developed into a photographic image and
   (h) second developer materials physically separate from said first materials and contained within said camera body for developing images exposed onto said first materials, said second developer materials comprising a photographic developer material suitable for substantial dilution.

2. A pinhole camera as in claim 1, said shutter comprises an adhesive tape.

3. A pinhole camera as in claim 1, wherein said inner surface of said camera is coated with an light absorbing material.

4. A pinhole camera as in claim 1, wherein said aperture is located on said sidewall.

5. A pinhole camera as in claim 1, wherein said aperture is located on said detachable cover.

6. A pinhole camera as in claim 1, wherein said camera contains two or more apertures.

7. A pinhole camera as in claim 6, wherein one aperture is located on said sidewall and a second aperture is located on said detachable cover or said base.

8. A pinole camera as in claim 7, wherein one aperture is located on said sidewall and a second aperture is located on said detachable cover.

9. A pinhole camera as in claim 8, wherein said inside of said camera only in said area defining said aperture is painted black.

10. A pinhole camera as in claim 1, wherein said support for holding a photographic material is an adhesive tape.

11. A pinhole camera as in claim 1, wherein said support member for holding a photographic material is a mechanical support.

12. A pinhole camera as in claim 3, wherein said coating is light absorbing and covers all of said inner surface.

13. A pinhole camera as in claim 1, wherein said camera is a can.

14. A pinhole camera as in claim 1, said shutter comprises a magnetic plastic member.

15. A pinhole camera as in claim 14, wherein said photographic material may be positioned within said camera supported by said support member for use with at least one aperture.

16. A pinhole camera as in claim 15, wherein said inner surface forms a curved image plane for positioning said photographic material.

17. A pinhole camera as in claim 1, wherein said inner surface forms a curved image plane for positioning said photographic material.

18. A pinhole camera as in claim 1, said second materials comprise a clear plastic tube for the development of photographic material.

19. A pinhole camera as in claim 1, wherein said camera is made from a cylindrical object.

20. A pinhole camera as in claim 1, wherein said shutter may be secured to and removed from said camera body.

21. A pinhole camera as in claim 1, wherein said inner or outer surface is coated with a chemically resistant material.

22. A pinhole camera as in claim 1, wherein said support member for holding a photographic material is a magnet.

23. A pinhole camera as in claim 1, wherein chemical solutions for in-camera processing of a photograph may be placed.

24. A pinhole camera as in claim 1, wherein photographic films or papers may be placed in a variety of positions.

25. A pinhole camera, as in claim 1, wherein filters and other materials affecting the contrast, color or artistic rendering of the photograph may be placed.

26. A pinhole camera as in claim 1, constructed in such a way that all exposed parts have a high degree of chemical resistance.

27. A kit as in claim 9, further comprising a grasping member secured to said sidewall.

28. A kit for making pictures and carrying materials for exposing and developing pictures comprising
(a) a base,
(b) a sidewall secured to and extending from said base, said sidewall having a top and a bottom portion, said base being secured to said bottom portion: and said top portion defining an opening,
(c) a detachable cover adapted to be secured to said top portion of said sidewall to close said opening, said base, side wall and detachable cover defining a camera body, said camera body having an inner surface, and an outer surface,
(d) a support member for holding a photographic material within said camera body,
(e) at least one pinhole aperture defined in said camera body,
(f) a shutter for opening and closing said pinhole aperture,
(g) first light sensitive non-self developing materials for receiving and recording a photographic image contained within said camera body, said first materials comprising a substrate and a light-sensitive coating disposed on said substrate, said first materials requiring additional materials not associated with said first materials in order to be developed into a photographic image and
(h) second developer materials physically separate from said first materials and contained within said camera body for developing images exposed onto said first materials, said second developer materials comprising a photographic developer material suitable for substantial dilution.

29. A kit for making pictures and carrying materials for exposing and developing pictures comprising
(a) a base,
(b) a sidewall secured to and extending from said base, said sidewall having a top and a bottom portion, said base being secured to said bottom portion, and said top portion defining an opening, said base and said sidewall forming a camera body,
(c) a detachable cover adapted to be secured to said top portion of said sidewall to close said opening, said base, side wall and detachable cover defining a camera body, said camera body having an inner surface, and an outer surface,
(d) a support member for holding a photographic material within said camera body,
(e) at least one pinhole aperture defined in said camera body,
(f) a shutter for opening and closing said pinhole aperture,
(g) first light sensitive non-self developing materials for receiving and recording a photographic image contained within said camera body, said first materials comprising a substrate and a light-sensitive coating disposed on said substrate, said first materials requiring additional materials not associated with said first materials in order to be developed into a photographic image,
(h) second developer materials physically separate from said first materials and said second developer materials comprising a photographic developer material suitable for substantial dilution contained within said camera body for developing images exposed onto said first materials, and said second developer materials comprising a photographic developer material suitable for substantial dilution,
(i) a layer of protective material disposed over said inner surface; and
(j) grasping member secured to said camera body.

* * * * *